(12) United States Patent
O'Quinn et al.

(10) Patent No.: US 8,292,015 B2
(45) Date of Patent: Oct. 23, 2012

(54) BATTERY-POWERED MINING VEHICLE

(75) Inventors: Roger L. O'Quinn, Blacksburg, VA (US); Jeffrey D. Looney, Christianburg, VA (US)

(73) Assignee: Caterpillar Global Mining America LLC, Oak Creek, WI (US)

( * ) Notice: Subject to any disclaimer, the term of this patent is extended or adjusted under 35 U.S.C. 154(b) by 166 days.

(21) Appl. No.: 12/840,515

(22) Filed: Jul. 21, 2010

(65) Prior Publication Data

US 2012/0018235 A1    Jan. 26, 2012

(51) Int. Cl.
B60R 16/04    (2006.01)
(52) U.S. Cl. ..................................................... 180/68.5
(58) Field of Classification Search ................. 180/68.5; 248/503; 104/34; 414/687, 695.5, 680, 697, 414/722, 727, 729, 458, 346
See application file for complete search history.

(56) References Cited

U.S. PATENT DOCUMENTS

| | | | | | |
|---|---|---|---|---|---|
| 3,834,563 | A | * | 9/1974 | Teti | 414/546 |
| 4,397,365 | A | * | 8/1983 | Harbe et al. | 180/68.5 |
| 5,003,236 | A | * | 3/1991 | Harless | 318/139 |
| 5,163,537 | A | * | 11/1992 | Radev | 180/65.1 |
| 5,275,525 | A | * | 1/1994 | Grumblatt | 414/458 |
| 5,399,061 | A | * | 3/1995 | Grumblatt | 414/812 |
| 5,598,083 | A | * | 1/1997 | Gaskins | 414/458 |
| 5,664,932 | A | * | 9/1997 | Clonch et al. | 414/680 |
| 5,767,658 | A | | 6/1998 | Hayes | |
| 5,820,331 | A | * | 10/1998 | Odell | 414/685 |
| 5,855,467 | A | * | 1/1999 | Clonch et al. | 414/680 |
| 5,879,125 | A | * | 3/1999 | Odell | 414/685 |
| 6,113,342 | A | * | 9/2000 | Smith et al. | 414/680 |
| 2007/0248445 | A1 | * | 10/2007 | Honeyman et al. | 414/680 |

FOREIGN PATENT DOCUMENTS

| | | |
|---|---|---|
| CA | 2278417 | 2/2000 |
| WO | WO 99/11507 | 3/1999 |

OTHER PUBLICATIONS

International Search Report and Written Opinion for International Application No. PCT/US2011/043862, mail date Mar. 9, 2012, 9 pages.

* cited by examiner

Primary Examiner — John Walters
Assistant Examiner — James Triggs
(74) Attorney, Agent, or Firm — Foley & Lardner LLP

(57) ABSTRACT

A device for controllably supporting a battery includes an arm, a first protrusion, a second protrusion, and a cylinder actuator. The arm has a compartment formed in the arm and an opening extending through the arm at a base of the compartment. The cylinder actuator includes a piston connected to a rod, and is positioned substantially in the compartment of the arm. The rod extends toward the opening of the arm, and the rod moves through the opening during operation of the cylinder actuator. Also, the first protrusion extends from the arm in a first direction and the second protrusion extends from the arm in a second direction.

19 Claims, 10 Drawing Sheets

BATTERY-POWERED MINING VEHICLE

BACKGROUND

The present disclosure relates generally to the field of mining vehicles. More specifically the present disclosure relates to a device for controllably supporting, lifting, and/or securing a large battery for use with a mining vehicle, such as a battery-powered, underground mining hauler.

Vehicles for underground mining operations, such as haulers for room and pillar type mining, may be powered by large batteries carried on the vehicles. Such a battery may include a housing containing an array of electrochemical cells, allowing the vehicle to travel without cords throughout a mine for a limited period of time. As the battery is depleted, the vehicle may drop off the expired battery for recharging at a designated station in the mine, pick up a fresh battery, and continue working. A typical mining hauler may include a lifting device for supporting, lifting, and/or securing the battery. The lifting device may also controllably raise and lower the battery as necessary for changing out the battery.

SUMMARY

One embodiment relates to a device for controllably supporting a battery. The device includes an arm, a first protrusion, a second protrusion, and a cylinder actuator. The arm has a compartment formed in the arm and an opening extending through the arm at a base of the compartment. The cylinder actuator includes a piston connected to a rod, and is positioned substantially in the compartment of the arm. The rod extends toward the opening of the arm, and the rod moves through the opening during operation of the cylinder actuator. Also, the first protrusion extends from the arm in a first direction and the second protrusion extends from the arm in a second direction.

Another embodiment relates to a system for controllably attaching a battery to a battery-powered vehicle. The system includes at least a portion of a frame of the vehicle, an arm, a housing for the battery, and an actuator. The arm is rotatably connected to the frame, and includes a first protrusion directed in a first direction and a second protrusion directed in a second direction. The housing for the battery supports one or more battery cells, and includes a hook and a slot. The actuator selectively rotates the arm relative to the frame such that the first protrusion engages the hook and the second protrusion engages the slot during operation of the system, for controllably attaching the battery to the vehicle.

Yet another embodiment relates to a mining vehicle powered by battery for hauling mineral deposits. The vehicle includes a bed section, a tractor, and an articulated joint between the bed section and the tractor section. The bed section of the vehicle is designed to support the mineral deposits. The tractor section of the vehicle includes an operator compartment. The vehicle further includes at least one arm and one cylinder actuator. The arm is pivotally connected to the tractor section, on a side of the tractor section that is opposite to the articulated joint. Further, the arm includes first protrusion extending from an end of the arm, a second protrusion extending from an underside of the arm, and a locking mechanism. The locking mechanism includes a linearly translatable locking member. The cylinder actuator pivots the arms relative to the tractor section during operation of the vehicle.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
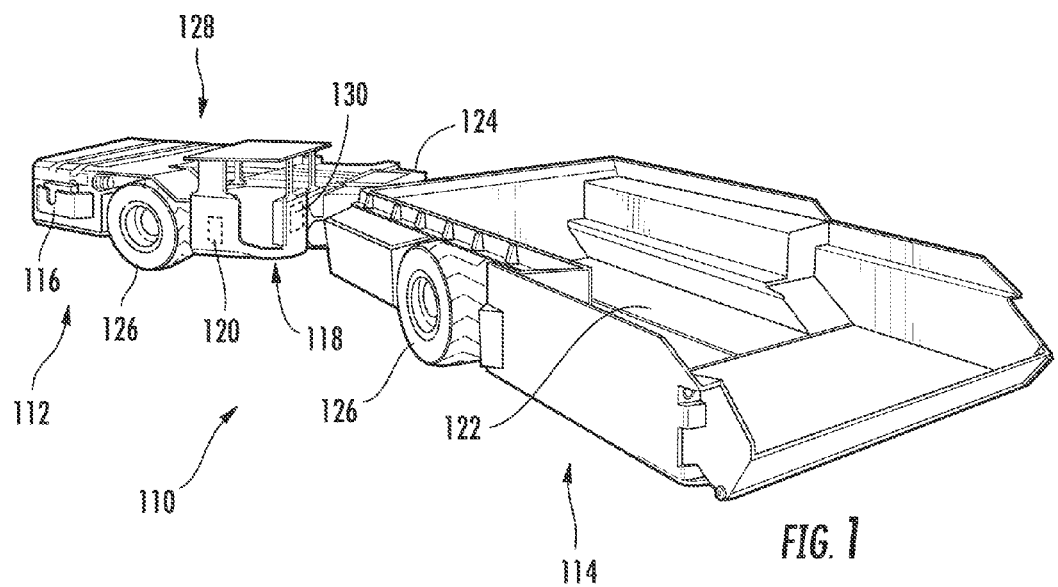
FIG. 1 is a perspective view of a mining vehicle according to an exemplary embodiment.

Referring to FIG. 1, a mining vehicle includes an on-board electrical power source (e.g., battery, capacitor bank). According to an exemplary embodiment, the vehicle is an underground mining vehicle 110 (e.g., hauler, shuttle car, load-haul-dump (LHD) vehicle), having a first portion (e.g., segment, section) that is a tractor section 112 and a second portion that is a bed section 114 for hauling mineral deposits. The tractor section 112 and bed section 114 are divided by a joint 124, rotatable about a vertical axis. The on-board power source is shown in FIG. 1 as a large battery 116, including an array of electrical cells stored therein. An operator of the vehicle 110 may drive the vehicle 110 to a loading area, haul mineral deposits through a mine, and deliver the deposits to a dumping area.

While FIG. 1 shows a mining vehicle 110, in other embodiments a battery lifting system may be used for other types of electric vehicles, such as a warehouse fork lift, construction equipment, or an electric cart. In still other embodiments, a battery lifting system may be used for stationary equipment or machines. While FIG. 1 shows the vehicle supporting the battery 116, in other embodiments objects other than batteries may be lifted, supported, raised, lowered, etc., by a lifting system according to the present disclosure.

Figure 2:
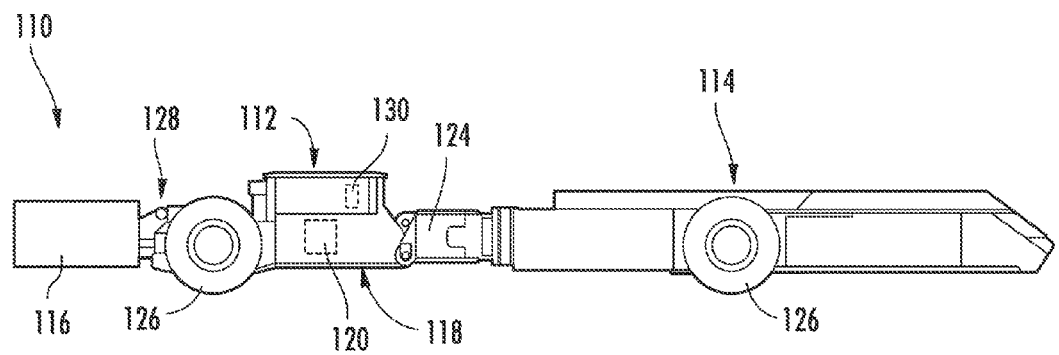
FIG. 2 is a side view of the mining vehicle of FIG. 1.

Referring now to FIG. 2, the tractor section 112 of the vehicle 110 includes an operator compartment 118 within which a controller 130 (e.g., joystick, console, interface, etc.) allows an operator to steer and/or otherwise control the vehicle 110. A computer 120 (e.g., circuitry, microprocessor, or other hardware) may be mounted to or in communication with the tractor section 112. According to an exemplary embodiment, the controller 130 is computerized such that operator commands are converted to an electrical signal, processed by the computer 120, and communicated to one or more electric motors and/or other components of the vehicle 110, such as hydraulic valves, linear actuators.

The bed section 114 of the vehicle 110 includes a work implement in the form of a bed 122 (see FIG. 1; e.g., hopper, platform, surface) for supporting gathered mineral deposits. However, in other contemplated embodiments, the mining vehicle includes a bucket for scooping, fork lift tines for equipment transportation, a cable reeler winch, a fuel and/or lubrication module for equipment support, a workman basket, a jib crane, or another work implement. In some embodiments, a vehicle is configured such that a work implement of the vehicle may be removed, replaced, or exchanged with another work implement, as needs require.

The tractor section 112 of the vehicle 110 is coupled to the bed section 114 via the joint 124 (e.g., pivot, fulcrum, articulated joint), such that the tractor and bed sections 112, 114 may each pivot about the joint 124. Pivoting of the sections 112, 114 about the joint 124 may provide the vehicle 110 with a reduced turn radius, relative to the length of the vehicle 110, allowing the vehicle 110 to maneuver through narrow mine passages. However in other contemplated embodiments, a vehicle is not articulated, or a vehicle includes three or more sections (and more than one joint) for articulation.

Each of the tractor and bed sections 112, 114 of the vehicle 110 includes at least one wheel 126. According to an exemplary embodiment, the tractor section 112 has two wheels 126 and the bed section 114 has two wheels 126. However in other embodiments, treads, runners, or other elements may be used to facilitate movement of the vehicle 110.

Figure 3:
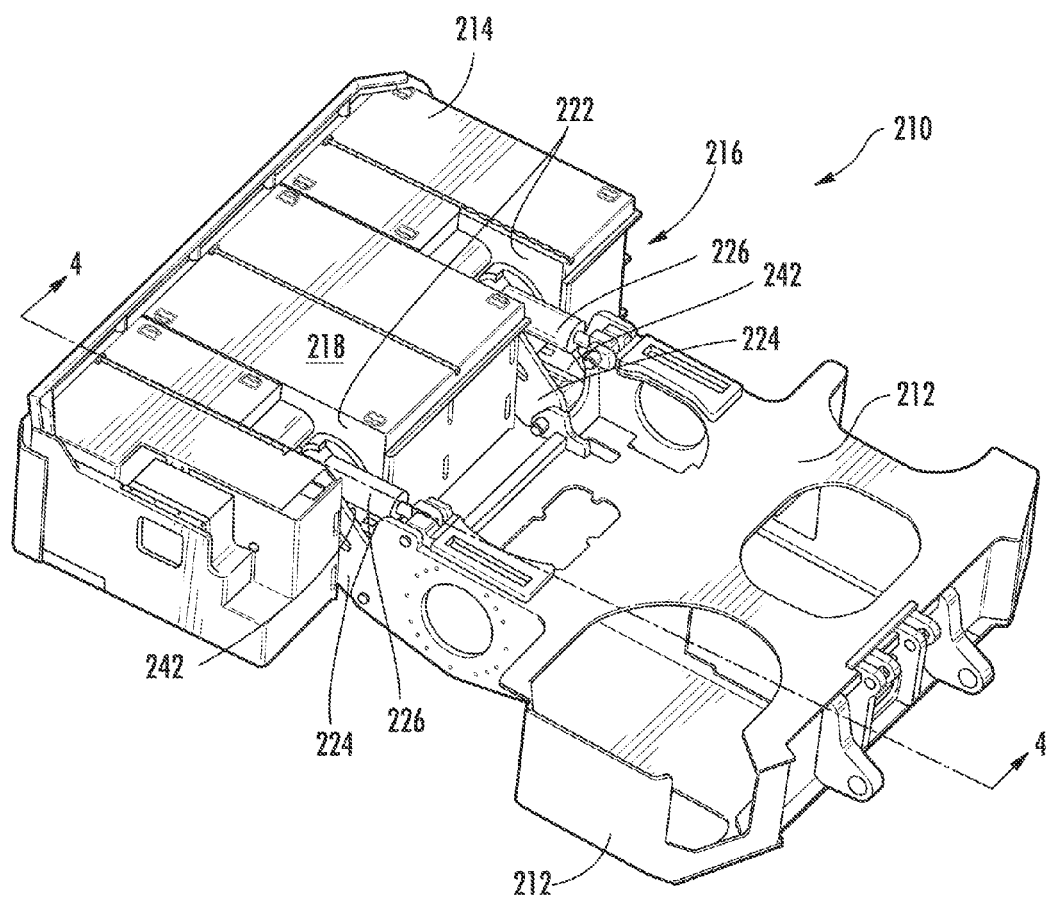
FIG. 3 is a perspective view of a portion of a mining vehicle according to an exemplary embodiment.
Figure 4:
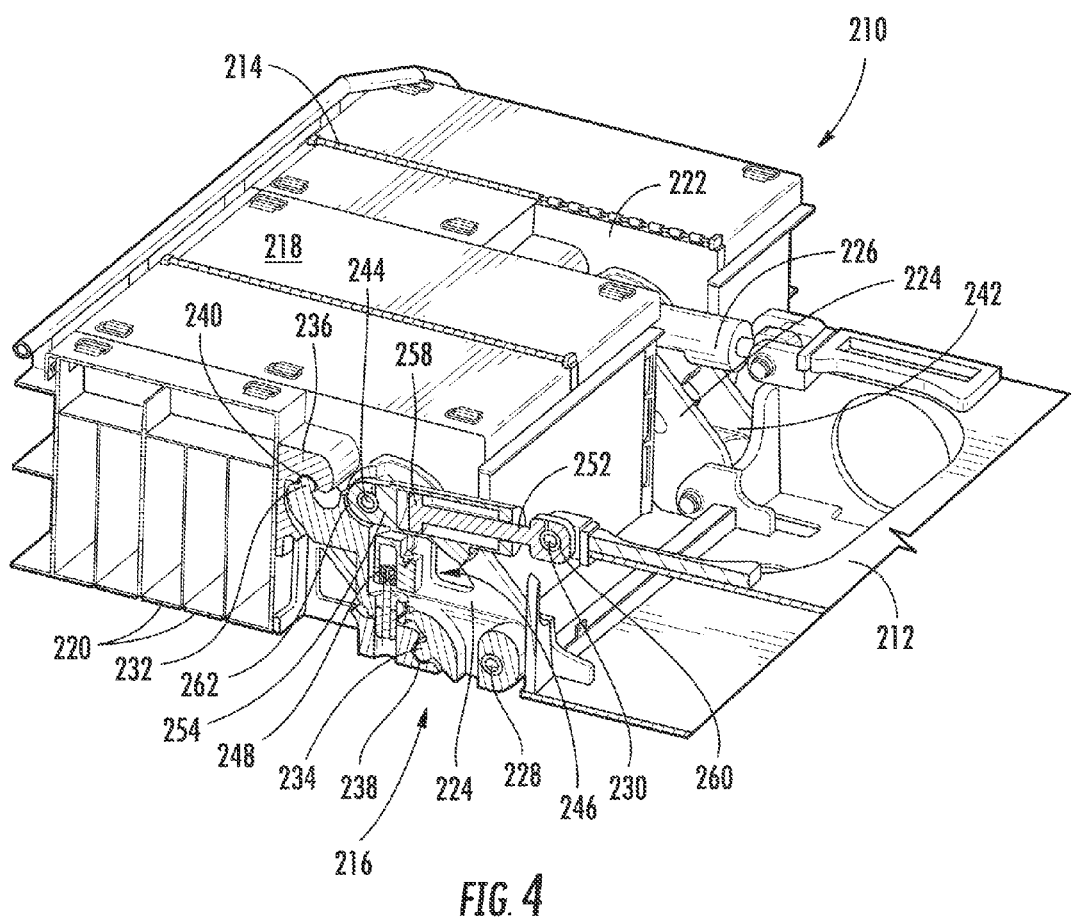
FIG. 4 is a perspective view of a section of the mining vehicle of FIG. 3 taken along line 4-4 of FIG. 3.

On the side of the tractor section 112 that is opposite to the joint 124, the tractor section 112 includes a battery lifting system 128 designed to controllably attach, lift, support, raise, and lower the battery 116. According to an exemplary embodiment, the battery lifting system includes one or more arms (see, e.g., arm 224 as shown in FIG. 4) that are pivotally coupled to a frame (see, e.g., frame 212 as shown in FIG. 3) of the tractor section 112. An actuator (see, e.g., actuator 226 as shown in FIG. 3) controllably pivots the arm about a pivot (see, e.g., pivot 228 as shown in FIG. 4), to physically engage and disengage the battery 116 from the tractor section 112 of the vehicle 110. Various forms of actuators are contemplated, such as a (e.g., hydraulic cylinder, a sprocket and chain, a worm gear and motor, pulleys and motor, etc. In other embodiments, a battery may be coupled to the bed section 114, or to another part of the tractor section 112.

Referring now to FIG. 3, a portion of a battery-powered vehicle 210 or other machine includes a frame 212 (e.g., front frame section, chassis, body structure) connected to a battery 214 by way of a lifting device 216. According to an exemplary embodiment, the frame 212 is configured to support components of a mining vehicle, such as wheels, an operator compartment, or a bed. Also according to an exemplary embodiment, the battery 214 includes a housing 218 (e.g., battery assembly, box, shell, case, pack) supporting one or more electrochemical cells 220 (see FIG. 4; e.g., fuel cells, energy-storage cells, capacitor bank, batteries). In some embodiments, the housing 218 of the battery includes one or more channels 222 (e.g., grooves, attachment features) within which the lifting device 216 may be attached to the battery 214.

Referring to FIG. 4, a sectional view of the portion of the battery-powered vehicle 210 shows components of the lifting device 216, which include an arm 224 and an actuator 226 (e.g., hydraulic cylinder, linear motor). According to an exemplary embodiment, the arm 224 is rotatably coupled (e.g., pinned) to the frame 212 at a pivot 228 proximate to a base of the frame 212. The actuator 226 of the lifting device 216 is also rotatably coupled to the frame 212, at a pivot 230 that is proximate to a top of the frame 212. Additionally, the actuator 226 is rotatably coupled to the arm 224 proximate to the end of the arm 224 that is opposite to the end rotatably coupled to the frame 212 (at pivot 228). As such, the actuator 226 is configured to move the arm 224 relative to the frame 212 about the pivot 228.

According to an exemplary embodiment, the arm 224 includes a first protrusion 232 (e.g., male connector, engagement point, boss, extension, projection, bulge, etc.) that extends from the arm 224 on an end of the arm 224 opposite to the end rotatably coupled to the frame 212. The arm 224 further includes a second protrusion 234 that extends from an underside of the arm 224, proximate to the end of the arm 224 that is rotatably coupled to the frame 212. Each protrusion 232, 234 includes a rounded outer surface having a convex periphery, and in some such embodiments the periphery defines a circular arc, as shown along a plane that is vertically oriented along a longitudinal (i.e. lengthwise) axis of arm 224, such as the sectional plane shown by the view of FIG. 4. In some such embodiments, the arc of one or both protrusions 232, 234 is greater than 90-degrees, such as greater than at least 180-degrees.

The rounded outer surfaces of the protrusions 232, 234 serve as contact surfaces, where rounding of the surfaces allows for distribution of loading over a wider area than a flat surface of similar width, reducing component wear and plastic deformation. Also, the rounded outer surfaces of the protrusions 232, 234, provide contact loads in more than one direction, improving the interlock with the battery 214. However, in other embodiments, the contact surfaces of the protrusions (and of corresponding structure of the battery 214) are not rounded, but instead are wedged, flat, or otherwise shaped.

According to an exemplary embodiment, the housing 218 of the battery 214 includes a hook 236 (e.g., flange, catch, bend) and a slot 238 (e.g., female connector, engagement point, socket, hole, aperture, channel), either or both of which may be integrally formed in the housing 218, or may be formed in an insert (e.g., separate piece) integrated with the housing 218. In some embodiments, the slot 238 includes a concave, rounded inner surface contoured to receive the second protrusion 234 of the arm 224, with substantially no open space therebetween (e.g., fine tolerance). The hook 236 forms another slot 240, in the bend of the hook 236. The slot 240 of the hook 236 is contoured to receive the first protrusion 232. Contact surfaces between the protrusions 232, 234 of the arm 224 and the slots 238, 240 of the housing 218 distribute associated contact forces over the rounded areas thereof, and constrain relative movement of the arm 224 and housing 218 in one or more degrees-of-freedom (e.g., at least two degrees-of-freedom, at least three degrees-of-freedom).

In some contemplated embodiments, arms of a lifting device include both a protrusion and a slot, and corresponding housing of a battery includes a slot contoured to receive the protrusion of the arm, and a protrusion contoured to be received by the slot of the arm. In other such embodiments, a lifting device includes three or more arms with corresponding channels and features in a housing of a battery. In some embodiments, at least one of the arms includes an arrangement of protrusions and/or slots that is different that the arrangement of protrusions and/or slots of another of the arms.

Figure 5:
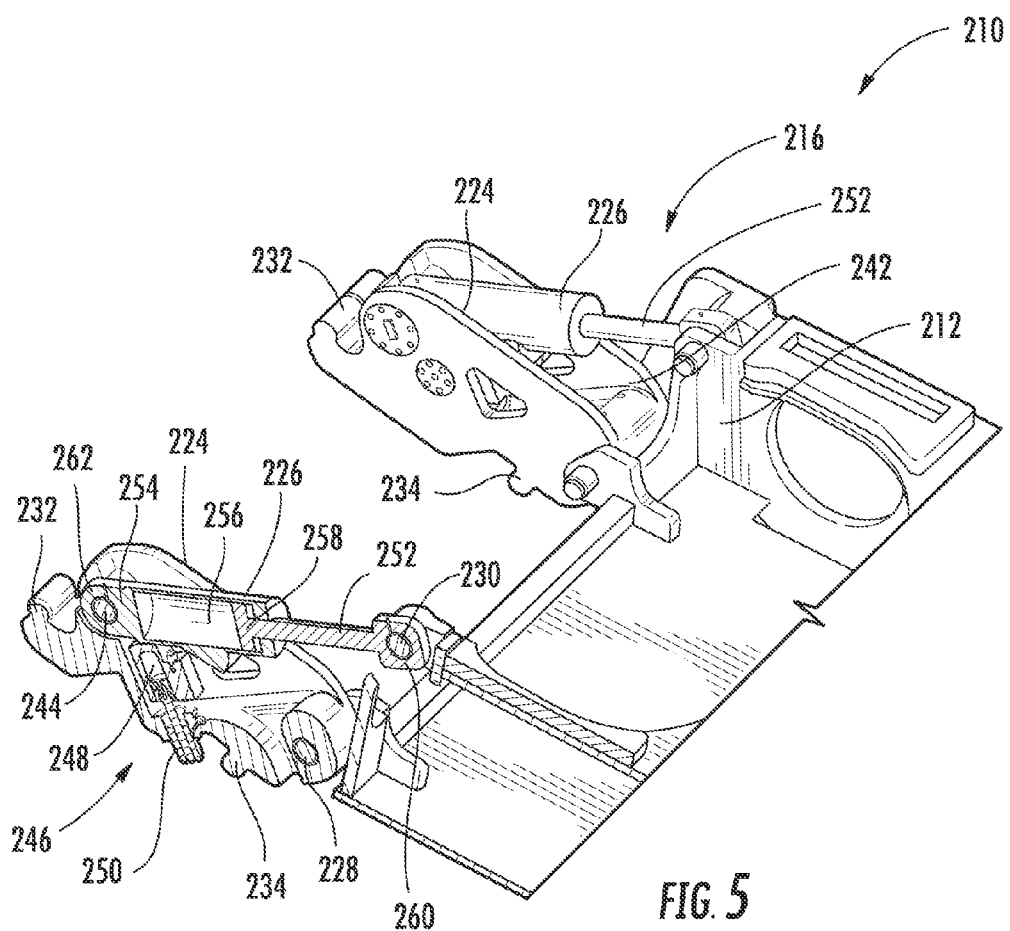
FIG. 5 is a perspective view of the mining vehicle of FIG. 3 in a first configuration.
Figure 6:
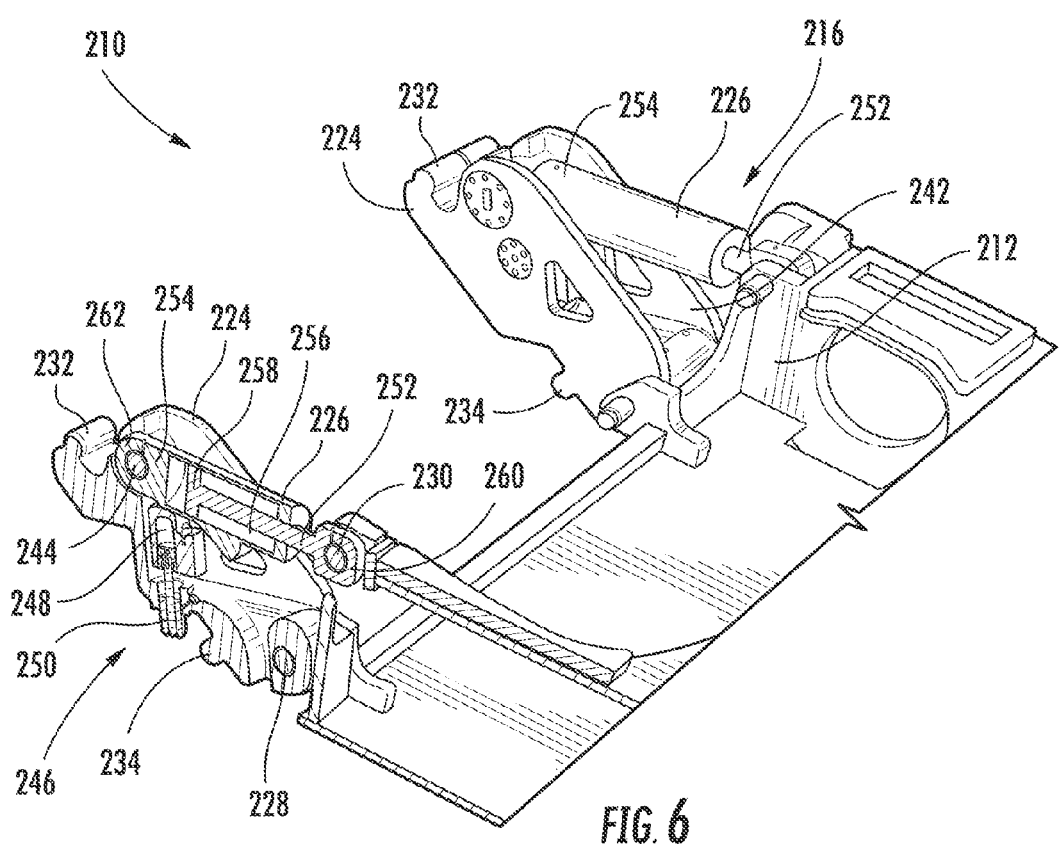
FIG. 6 is a perspective view of the mining vehicle of FIG. 3 in a second configuration.

Referring to FIGS. 5-6, according to an exemplary embodiment, the actuators 226 are hydraulic cylinders having a rod end 252 rotatably coupled to the frame 212 and a cap end 254 rotatably coupled to the arm 224. Actuation of each hydraulic cylinder is controlled by adding or removing hydraulic fluid from a chamber 256 therein, which translates a piston 258, moving the rod end 252 into or out of the hydraulic cylinder. Each arm includes a compartment 242 (e.g., enclosure, open volume), within which at least a portion of the actuator 226 extends. In some embodiments, the rod end 252 of the actuator 226 includes a rod-eye 260 (e.g., clevis) that is coupled to the frame 212, and the cap end 254 includes a similar eye 262 coupled to the arm 224, at a pivot 244 (e.g., pinned coupling) proximate to the first protrusion 232 and in the compartment 242. When the actuator 226 expands or contracts in length, the arm 224 rotates about the pivot 228. For example, the arms 224 of the lifting device 216 are shown in a lowered configuration (e.g., position, orientation) in FIG. 5, and in a raised configuration in FIG. 6.

In the lowered configuration (FIG. 5), the first protrusion 232 of the arm 224 may be inserted into the corresponding channel 222 (FIG. 3) in the housing 218 of the battery 214, allowing the first protrusion 232 to pass under the hook 236. Raising the arm 224 to the raised configuration (FIG. 6), engages the first protrusion 232 with the slot 240 of the hook 236. As the housing 218 of the battery 214 is lifted by force applied from the first protrusion 232 to the slot 240, the second protrusion 234 of the arm 224 is inserted into the slot 238. The first protrusion 232 and the second protrusion 234 each apply force to the housing 218, which is received in each of the slots 238, 240. Accordingly the battery 214 is lifted.

Figure 7:
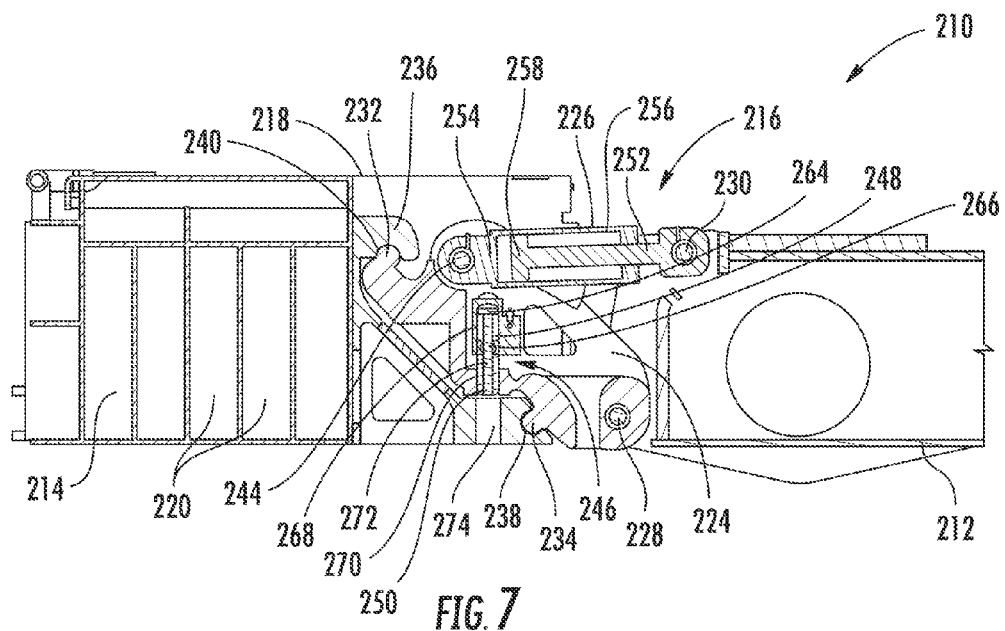
FIG. 7 is a side view of the mining vehicle of FIG. 3 in a first configuration.
Figure 8:
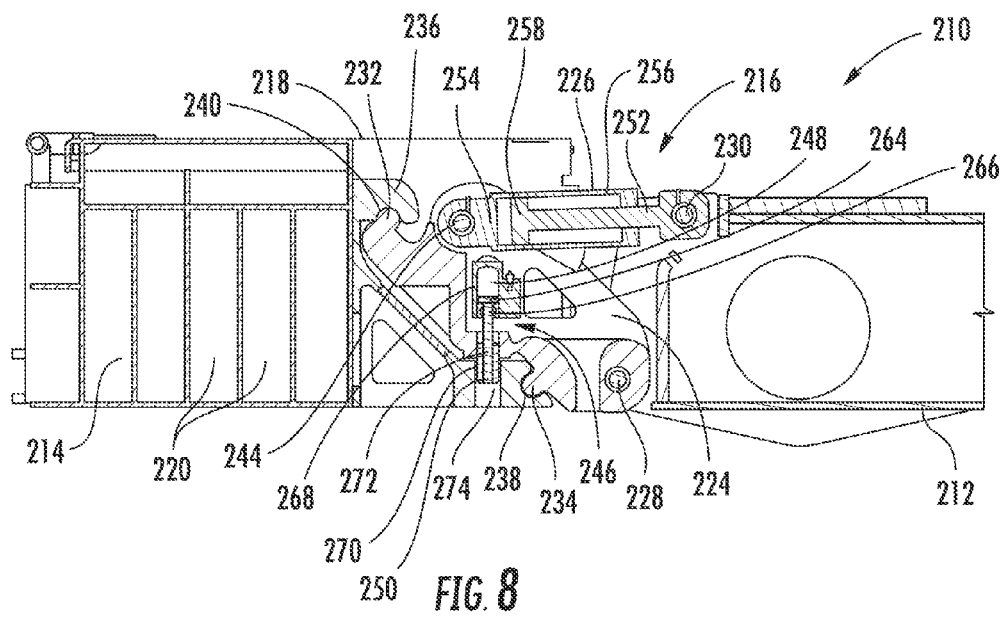
FIG. 8 is a side view of the mining vehicle of FIG. 3 in a second configuration.
Figure 9:
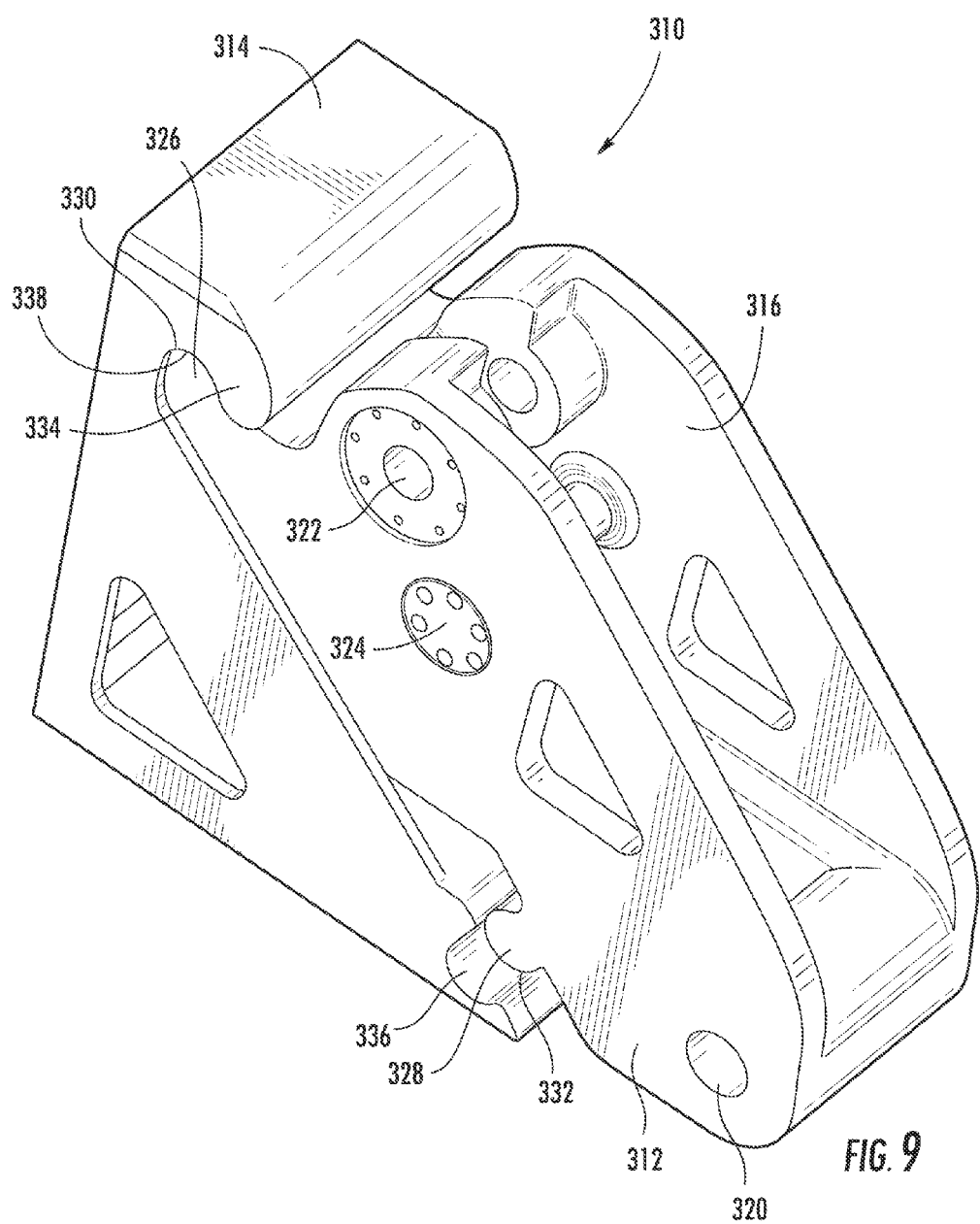
FIG. 9 is a first perspective view of a device for coupling according to an exemplary embodiment.
Figure 10:
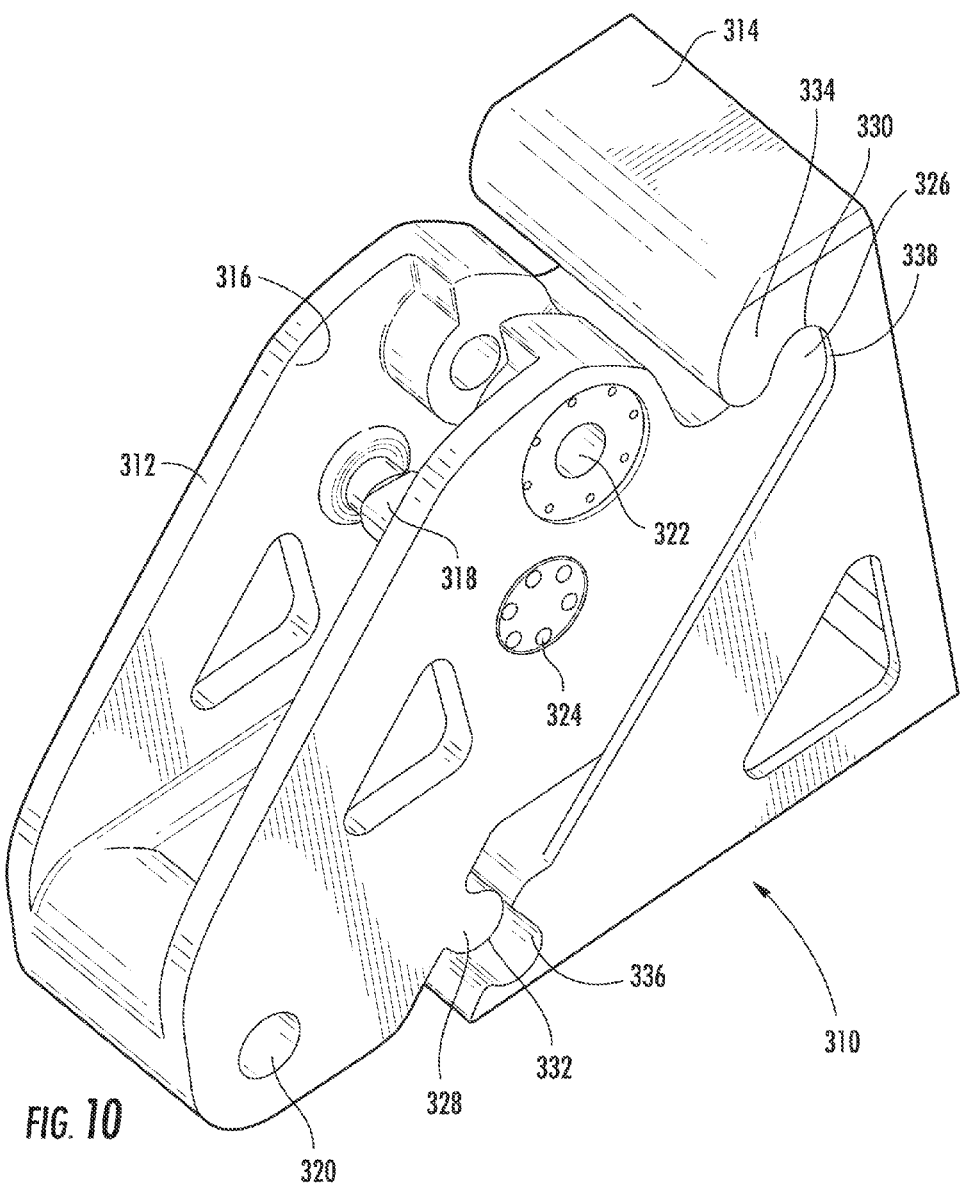
FIG. 10 is a second perspective view of the device for coupling of FIG. 9.
Figure 11:
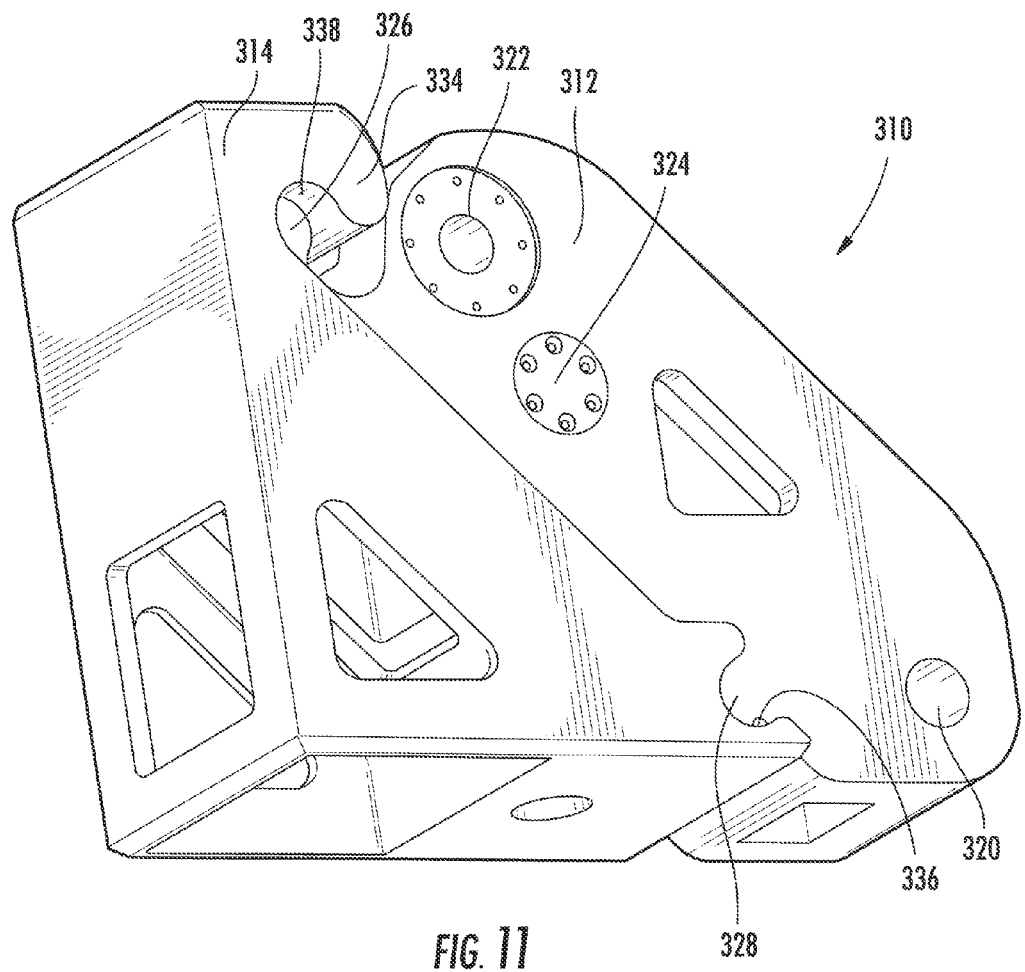
FIG. 11 is a third perspective view of the device for coupling of FIG. 9.
Figure 12:
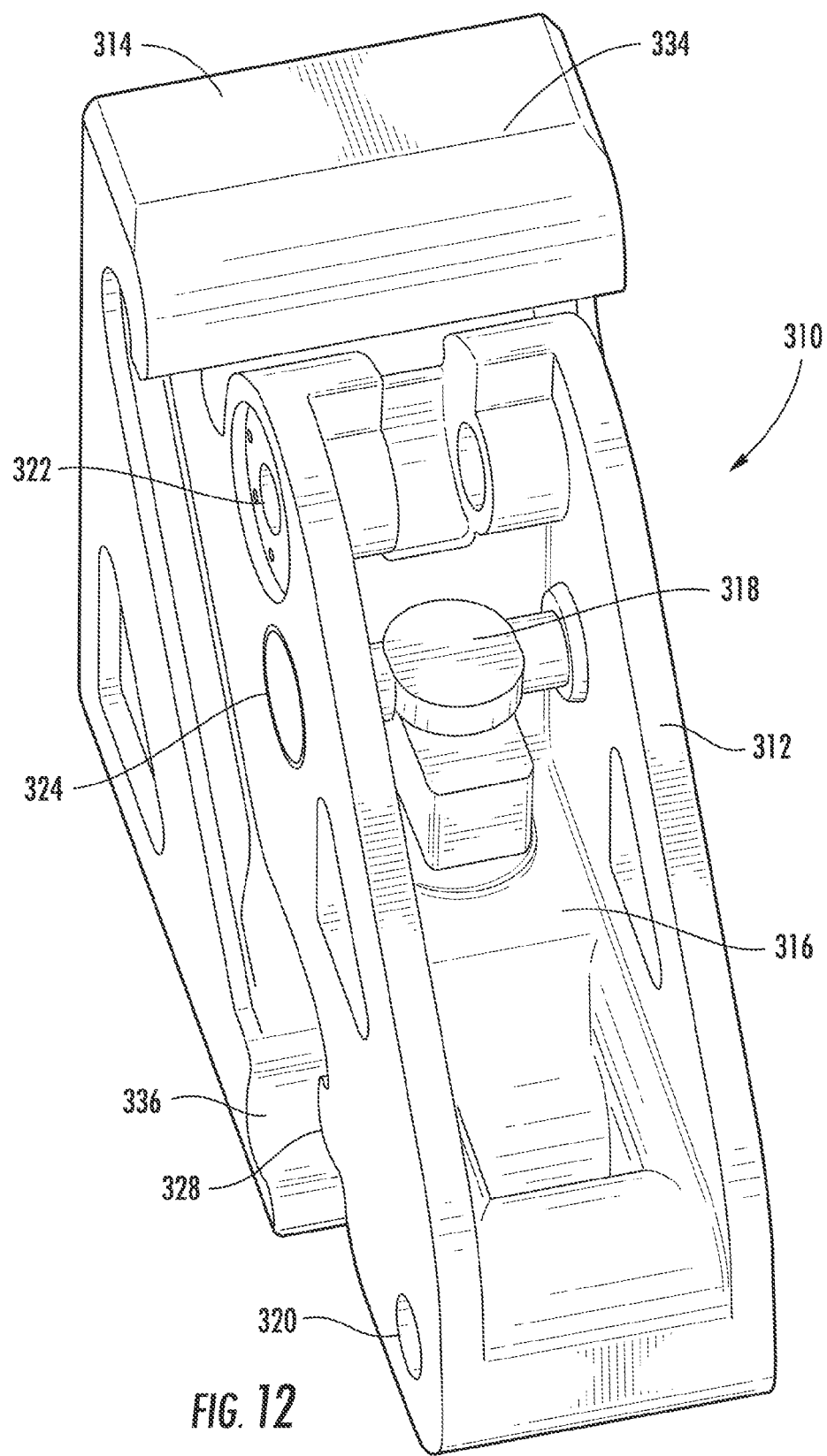
FIG. 12 is a fourth perspective view of the device for coupling of FIG. 9.

Referring to FIGS. 7-8, the battery-powered vehicle 210 further includes a locking mechanism 246 for interlocking the arm 224 and the housing 218 of the battery 214, when the battery 214 is being supported by the vehicle 210. According to an exemplary embodiment, the locking mechanism 246 includes an actuator in the form of a linear actuator 248 (e.g., linear motor, solenoid, pneumatic cylinder, hydraulic cylinder, etc.) and a locking member 250 that is selectively moved by the linear actuator 248. In some embodiments, the locking mechanism 246 is fastened to the arm 224, such as substantially within the compartment 242 of the arm 224. As such, the structure of the arm 224 may serve to shield the locking mechanism 246 from contact with other components of the vehicle 210 or outside objects (e.g., mine wall). However, in other embodiments a locking mechanism is instead fastened to the battery 214 or to another portion of the vehicle 210.

In some embodiments, the actuator 248 of the locking mechanism 246 is in the form of a cylinder (e.g., pneumatic or hydraulic cylinder) and includes a piston 264 (e.g., plunger) coupled to a rod 266 that extends through an end of a barrel 268 of the actuator 248. The rod 266 further extends through an opening 270 (e.g., aperture, conduit) in a base of the compartment 242 formed in the arm 224. On the underside of the arm 224, the rod 266 may be coupled to an extension forming a locking pin 272 (e.g., bolt, bar). The locking pin 272 is contoured to be inserted into a corresponding aperture 274 in the housing 218, when the protrusions 232, 234 of the arm 224 are supporting the housing 218.

Insertion of the locking pin 272 through the aperture 274 further secures the housing 218 to the arm 224 and the rest of the vehicle 210, in addition to the forces between the protrusions 232, 234 and slots 238, 240. Accordingly jostling, sharp turns, bumps, and the like experienced by the vehicle 210 traveling through a mine (or elsewhere) will be less likely to dislodge the battery 214 from the arm 224. When the battery 214 is to be unfastened from the vehicle 210, the locking pin 272 can be removed from the aperture 274, also by way of the actuator 248 of the locking mechanism 246.

According to an exemplary embodiment, the locking mechanism 246 may be operated by way of a manual valve control lever, moving the piston 264 into the aperture 274 in the housing 218 (e.g., insert, channel) of the battery 214. As such, the battery 214 is in a carrying position, where the battery 214 will not release from the vehicle 210 until unlocked. In other embodiments, the locking mechanism 246 may additionally be activated by way of an automated valve control lever, operated by a controller (see, e.g., controller 130 as shown in FIG. 2). In some embodiments, the locking mechanism 246 includes a switch or a sensor for locating the position of the piston 264, allowing for a visual indication (e.g., communicated to an operator in an operator compartment) that the battery 214 is or is not locked into position on the arms 224.

Without wishing to be bound by any theory, it is believed that a locking mechanism including a linear actuator and locking pin may be less likely to jam and/or stick when compared to other forms of locking mechanisms (e.g., sliding or pivoting latches), reducing the likelihood of vehicle downtime and/or maintenance needs. However, other contemplated embodiments may include sliding or pivoting latches or other forms or combinations of locking mechanisms.

Referring now to FIGS. 9-12, a coupling system 310 (e.g., fastening device, system for attachment) between two bodies (see, e.g., battery 214 and frame 212 as shown in FIG. 3) includes a first component in the form of an arm 312 (e.g., male connector) and a second component in the form of a receiving portion 314 (e.g., female connector, battery case insert). The coupling system 310 is configured to apply a moment between the arm 312 and the receiving portion 314 for lifting the body attached to the receiving portion 314 and/or for coupling the body attached to the receiving portion 314 with the body attached to the arm 312.

According to an exemplary embodiment, a compartment 316 is formed in the arm 312, within which components may be coupled to the arm 312. In some embodiments, a locking mechanism 318 is positioned at least partially within the compartment 316. The locking mechanism 318 includes a locking member (see, e.g., locking pin 272 as shown in FIGS. 7-8) that extends at least partially through an opening (see, e.g., opening 270 as shown in FIGS. 7-8) formed in the arm 312, in a base of the compartment 316.

The arm 312 further includes a first transverse aperture 320 and a second transverse aperture 322. The first transverse aperture 320 is designed for receiving a first pin (see, e.g., pivot 228 as shown in FIG. 4) for coupling the arm 312 to the body to be attached thereto. The second transverse aperture 322 is designed for receiving a second pin (see, e.g., pivot 244 as shown in FIG. 4) for coupling the arm 312 to an actuator (see, e.g., actuator 226 as shown in FIG. 4). The actuator may move the arm 312 about the body attached to the arm by the first pin. In some embodiments, at least a portion of the actuator extends into the compartment 316. According to an exemplary embodiment, the arm 312 further includes a third transverse aperture 324 through which one or more fastening members may be inserted for fastening the locking mechanism 318 to the arm 312.

According to an exemplary embodiment, the arm 312 further includes two protrusions 326, 328 having contact surfaces 330, 332 thereon, respectively. The first protrusion 326 extends diagonally upward and toward the body attached to the arm 312. The second protrusion 328 extends diagonally downward and away from the body attached to the arm 312. In some embodiments, the protrusions 326, 328 are convex, rounded protrusions having an exterior periphery that defines a circular arc of at least 180-degrees.

The receiving portion 314 includes a hook portion 334 thereof and a slot portion 336 thereof. The hook portion 334 extends from a top of the receiving portion 314 and curls downward forming a second slot 338. During operation of the coupling system 310, the first protrusion 326 may be inserted into the second slot 338 and the second protrusion 328 may be simultaneously inserted into the first slot 336, such that each protrusion 326, 328 and each slot 336, 338 form a contact interface therebetween, allowing torque to be applied. The torque may lift and/or support the body attached to the receiving portion 314. When the protrusions 326, 328 are engaged with the slots 336, 338, the locking mechanism 318 may be selectively activated to further interlock the arm 312 and the receiving portion 314.

The receiving portion 314 further includes a sloped surface for guiding the protrusions 326, 328 of the arm 312 to the slots 336, 338 (see also arm 224 and corresponding housing 218 of the battery 214 as shown in FIGS. 7-8). If the arm 312 is inserted too low for proper engagement, the sloped surface of the receiving portion 314 lifts the arm 312 to the proper level for engagement (e.g., float engagement feature). In some embodiments, the receiving portion 314 may be coupled to a battery housing having sloped surfaces that are part of the receiving portions. In such embodiments, the sloped surfaces guide the arms as the vehicle approaches the battery and the arms enter the receiving portions, which may be achieved by actuating a control handle. The sloped surfaces are intended to assist with arm alignment to the battery receiving portions. Once alignment is achieved, then the battery lift control handle may be activated to raise the battery to the desired operating position.

The construction and arrangements of the battery-powered vehicle and device for controllably supporting a battery, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, a hook may be formed in a bottom of the battery housing, forming an upwardly directed slot. Also, the actuator may be coupled to the arm on an opposite side of the pivot by which the arm is coupled to the frame such that expansion of the actuator rotates the arm upward. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A device for controllably supporting a battery, comprising:
    an arm having a compartment formed therein and having an opening extending through the arm at a base of the compartment;
    a first protrusion extending from the arm in a first direction providing a first lifting surface for contacting a first portion of the battery;
    a second protrusion extending from the arm in a second direction providing a second lifting surface for contacting a second portion of the battery; and
    a cylinder actuator positioned in the compartment of the arm, and the cylinder actuator comprising:
        a piston configured to translate within the cylinder, and
        a rod coupled to the piston, the rod extending from the cylinder actuator toward the opening of the arm at the base of the compartment,
        wherein the rod moves through the opening during operation of the cylinder actuator providing a locking interface with the battery.

2. The device of claim 1, wherein the first and second protrusions each have a rounded cross-section along a plane defined vertically along a longitudinal axis of the arm.

3. The device of claim 2, wherein each rounded cross-section includes a periphery defining a circular arc.

4. The device of claim 3, wherein each circular arc is at least 180-degrees.

5. The device of claim 4, wherein the first and second directions are substantially opposite to each other.

6. A system for controllably attaching a battery to a battery-powered vehicle, comprising:
    a frame of at least a portion of the vehicle;
    an arm rotatably coupled to the frame, the arm comprising:
        a first protrusion directed in a first direction;
        a second protrusion directed in a second direction; and
    a housing for the battery supporting one or more battery cells, the housing comprising a hook and a slot;
    a first actuator, wherein the first actuator selectively rotates the arm relative to the frame such that the first protrusion engages the hook and the second protrusion engages the slot during operation of the system for controllably attaching the battery to the vehicle; and
    a second actuator having a locking member coupled thereto, wherein the second actuator selectively engages the locking member, locking together the arm and the housing of the battery.

7. The system of claim 6, wherein the second actuator is at least one of a solenoid, a pneumatic cylinder, or a hydraulic cylinder.

8. The system of claim 7, wherein the second actuator is fastened to the arm, and wherein the second actuator selectively interlocks the locking member with the housing.

9. The system of claim 6, wherein the second actuator is a cylinder actuator, and the locking member is a locking pin that selectively engages an aperture in the housing of the battery when moved by the cylinder actuator.

10. The system of claim 9, further comprising:
    a computerized controller in communication with both the first actuator and the second actuator, allowing an operator of the system to both rotate the arm relative to the frame and move the locking pin relative to the aperture in the housing via the controller.

11. The system of claim 9, wherein the slot comprises a concave surface contoured to receive a mating convex surface of the second protrusion.

12. The system of claim 11, wherein the first protrusion comprises a convex surface contoured to fit a second slot formed by the bend of the hook.

13. The system of claim 12, wherein the first and second directions are substantially opposite to each other.

14. The system of claim 13, wherein the first direction is defined diagonally upward and toward the vehicle frame, and the second direction is defined diagonally downward and away from the vehicle frame.

15. An mining vehicle powered by battery for hauling mineral deposits, comprising:
   a bed section of the vehicle configured to support the mineral deposits;
   a tractor section of the vehicle comprising an operator compartment;
   an articulated joint between the bed section and the tractor section;
   an arm pivotally coupled to the tractor section on a side thereof opposite to the articulated joint, the arm comprising:
      a first protrusion extending from an end of the arm,
      a second protrusion extending from an underside of the arm, and
      a locking mechanism comprising a linearly translatable locking member;
   a cylinder actuator for pivoting the arm relative to the tractor section; and
   a battery having a housing comprising:
      a first slot contoured to receive the first protrusion,
      a second slot contoured to receive the second protrusion, and
      an aperture contoured to receive the locking member,
   wherein the battery is controllably supported by the arm during operational use of the vehicle.

16. The vehicle of claim 15, wherein the locking mechanism comprises a second cylinder for linearly translating the locking member, and wherein the locking member is a locking pin.

17. The vehicle of claim 16, wherein the second cylinder is positioned substantially within a compartment formed in the arm.

18. The vehicle of claim 17, wherein the first and second protrusions each have a rounded cross-section including a periphery defining a circular arc that is at least 180-degrees.

19. The vehicle of claim 18, wherein the housing of the battery further includes a sloped surface for guiding the first and second protrusions of the arm to the first and second slots of the housing of the battery.

* * * * *